Jan. 22, 1963 R. F. RYAN ETAL 3,074,776
GASEOUS DISPOSAL PROCESS
Filed Sept. 28, 1960
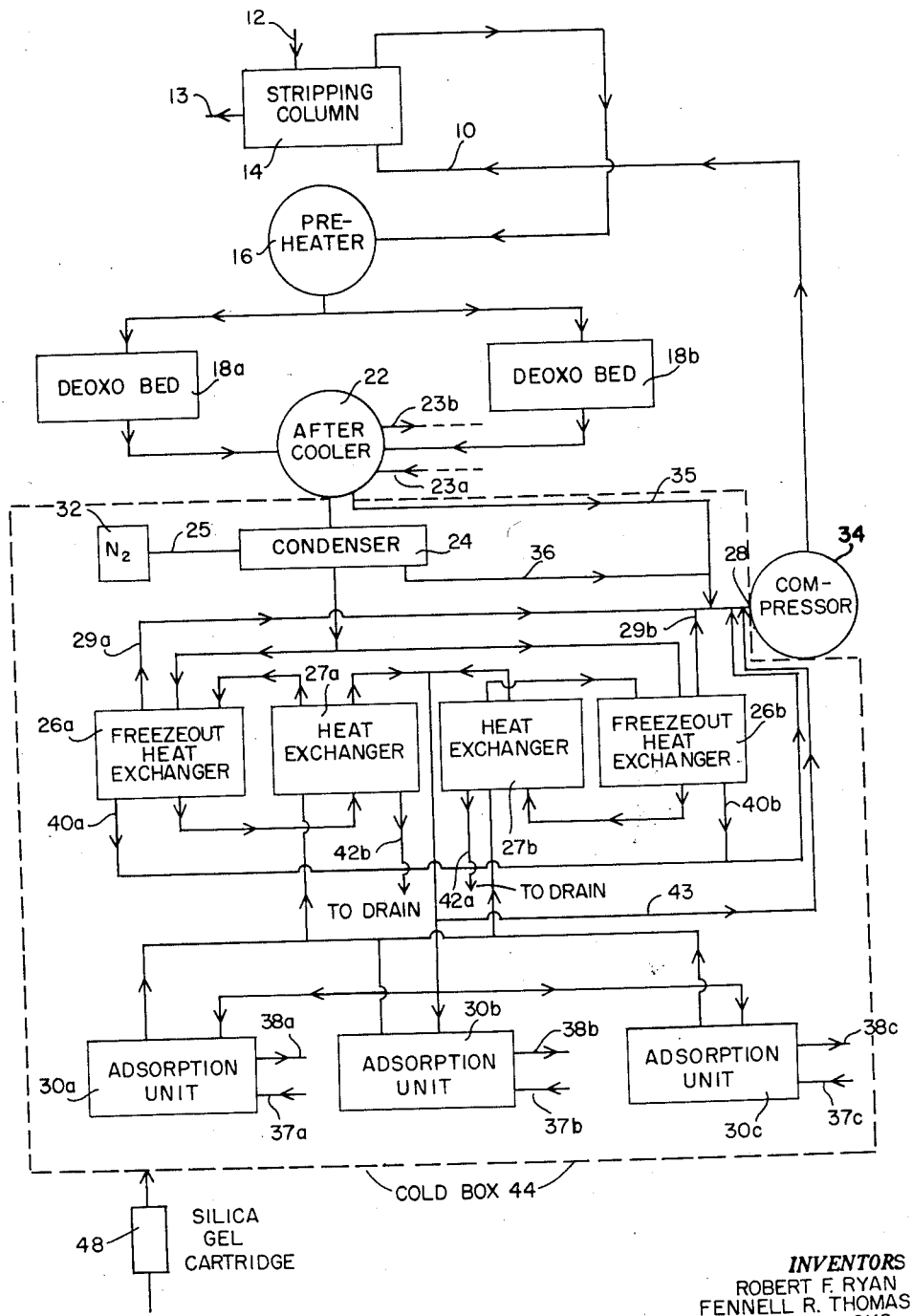
INVENTORS
ROBERT F. RYAN
FENNELL R. THOMASSON
JACK H. HICKS
BY 3,074,776
GASEOUS DISPOSAL PROCESS
Robert F. Ryan, Lynchburg, Fennell R. Thomasson, Madison Heights, and Jack H. Hicks, Bedford, Va., assignors to the United States of America as represented by the United States Atomic Energy Commission
Filed Sept. 28, 1960, Ser. No. 59,130
2 Claims. (Cl. 23—2)

This invention relates to the disposal of fission product gases and more particularly to the removal of fission product gases from a water system.

The problem of handling the gaseous fission product gases appearing in water systems found in certain pressurized water reactors, for example, is a considerable one. Xenon and krypton, because of their radioactivity, are the two major fission product gases which may make these gases too dangerous to be released into the atmosphere indiscriminately. Yet, it is also essential that these gases not be allowed to attain too high a concentration within the nuclear reactor which is emitting neutrons as these gases are considered "poisonous" in such an area. This is true especially after the shut down of a nuclear reactor.

One means of disposing of radioactive gases which are accumulated in a nuclear reactor or from nuclear materials is to release these gases through a vent system to tank storage with other effluent gas, allow the radioactive gases to decay and then allowing the resultant mixture to be discharged, after filtration, through a stack with air dilution being employed to reduce the radiation level to tolerable concentrations. However, if xenon and krypton are among the fission product gases of a nuclear reaction, the gases can not be handled in a similar manner because of their high radioactivity and length of xenon and krypton half-lives. Attempts to devise a process to provide for a closed cycle collection of the majority of the radioactive fission product gases, xenon and krypton in particular, and make it possible for other effluent gases to be discharged through a small stack facility have not met with much success.

Therefore, an object of this invention is to devise a process which provides for a closed cycle collection and retention of the majority of fission product gases which are released from a nuclear reactor and which are primarily, but not necessarily, collected in a water system.

A further object of this invention is to devise a new process for the disposal of waste fission gases from a nuclear reactor.

A further object of this invention is to devise a process for the disposal of waste fission gases on the shutdown of a nuclear reactor.

Another object of this invention is to devise a new and compact means of accumulating highly radioactive fission gases within the immediate area of a nuclear reactor.

Another object of this invention is to devise a process for the adsorption and removal of xenon and krypton fission product gases.

A further object of this invention is to devise a low temperature adsorption system for the retention and subsequent disposal of radioactive waste gases.

A fuller understanding of the invention and its objects may be had by referring to the following description, taken in conjunction with the accompanying block diagram.

The gaseous disposal process that is described in this application can be used in a pressurized water reactor of the type disclosed in U.S. patent application Serial Number 790,029, filed January 29, 1959, now Patent No. 2,982,713.

Essentially, this invention consists of flowing hydrogen carrier gas in counter current flow with a water system, contaminated with radioactive gases, in a stripping column. The hydrogen gas, after stripping the impurities from the contaminated water, is vented to gas adsorption process equipment which catalytically combines any gaseous oxygen present with some of the hydrogen flow to form water in a deoxo unit, progressively cools the remaining gas mixture to a low temperature and condenses waste from the gas flow, collecting fission product gases from the gas flow in an adsorption unit, and returning purified hydrogen carrier gas to the stripping column by means of a process gas compressor.

Referring to the block diagram, the apparatus shown therein for carrying out the process of this invention consists of a stripping column 14 for removing the gaseous wastes from the water system 12, with carrier gas 10, followed by a preheater 16 of common design, the decontaminated water being passed back into the water system by outlet 13.

The output of the preheater 16 is connected to a pair of deoxo beds 18a and 18b which contain palladium or platinized alumina pellets or any other catalyst capable of acceleration of a hydrogen-oxygen reaction for the formation of water. The connection to the deoxo beds 18a and 18b may be valved for alternate use. The water formed in the deoxo unit 18a and 18b is formed as a vapor. Subsequent cooling of the gas stream first in a water cooled after cooler 22 and then in a conventional conduction cooled water condenser 24 leads to condensation of the bulk of the water from the gas flow in the water condenser 24. Cooling in the water condenser 24 is accomplished by heat conduction from an assembly of condenser plates to a conduction rod 25 to liquid nitrogen contained in a liquid nitrogen reservoir vessel 32. The effluent gas is thereafter passed through regenerative heat exchangers 26a and 27a or 26b and 27b. Both the water condenser 24 and the heat exchanger units 26a, 27a or 26b, 27b have means for periodically blowing down water through lines 36, 40a or 40b to the gas compressor inlet 28 for eventual reuse in the water system. Drains 42a and 42b are also connected to the regenerative heat exchangers for water removal. A bypass line 43 from the process gas outlet of these units provides for partial process operation when desired by passing flow to the compressor 28 inlet in place of the adsorbers hereafter described.

One of a plurality of adsorbers 30a, 30b or 30c receives the output of heat exchanger 27a or 27b. Each adsorption unit is designed for collection of xenon and krypton for 50 days' operation per adsorption unit. These units after use may be regenerated by heating the adsorbent container and drawing a vacuum on the adsorbent charge, or passing a gas such as helium or hydrogen through the adsorbent charge as part of the heating process. It is anticipated, but not necessary, that regeneration be accomplished at a facility other than at the location of the adsorption units.

Each adsorber 30a, 30b or 30c consists of an inner tube containing activated carbon, an outer tube containing liquid nitrogen which cools the unit and enters through line 37a, 37b or 37c and departs through line 38a, 38b or 38c, respectively, and a lead radiation shield (not shown).

It is to be understood that all connections referred to herein may be remotely or manually controlled. Before installation in the equipment, the adsorption units 30a, 30b or 30c are to be activated by high heat under vacuum to obtain the maximum adsorption capacity. The design and installation of these units is to be such that they can be isolated and replaced with no loss of collected gases and minimum radiation exposure hazard.

The inner tube of the adsorption units 30a, 30b and 30c is constructed for a maximum pressure of 1200 p.s.i.g. and maximum and minimum temperatures of 150° F. and —320° F. The output from these units is passed back to heat exchangers 27a, 26a or 27b and 26b, whichever one is in operation for heat exchange with the gaseous output from condenser 24. The closed system shown is completed by a compressor 34 for delivering the hydrogen gas from heat exchanger 26a or 26b back to stripping column 14 by way of line 10 for reuse in the process.

The arrangement shown in the FIGURE operates to carry out the process as follows:

Hydrogen 10 is passed through stripping column 14 which strips the radioactive gases from a letdown water flow 12 and sweeps them through to preheater 16. A counter flow of hydrogen gas 10 to water or liquid flow provides for the stripping of the gases from the water or liquid. High density polyethylene rosette, such as "Tellerette," packing contained in the stripping column 14 serves to increase the amount of liquid gas contact during passage of the respective flows through the stripping column 14. The first operation of the system is the removal of oxygen from the carrier gas stream. This is accomplished by combining the oxygen with hydrogen in the deoxo beds 18a or 18b. The preheating of the gases in preheater 16 prevents condensation in the deoxo beds 18a or 18b.

The preheater 16 outlet temperature should be maintained at 200° F. or higher to prevent halogen or moisture poisoning of the deoxo catalyst.

With the major portion of oxygen being in the form of vaporized water the gases are then passed into the after cooler 22. Cooling in the after cooler 22 is accomplished by flow of water from cooling water entering through inlet 23a and departing through outlet 23b. Cooling flow in after cooler 22 is adjusted to produce an effluent process gas temperature of 120° F. or lower.

Water condenser 24 receives the effluent gas and water mixture leaving the after cooler 22 and condenses the remaining water vapor and delivers its gaseous product to heat exchangers 26a, 27a or 26b and 27b. The effluent from the water condenser 24 is cooled to approximately 35° F. for removal of moisture. A drain line 36 is connected between the water condenser 24 and the inlet 28 of the process gas compressor 34 and through operation of a solenoid valve in the line 36 draining of water from the water condenser 24 to the process gas compressor 34 is accomplished.

Effluent gas from water condenser 24 is conveyed to one of two sets of regenerative heat exchangers 26a, 27a and 26b and 27b, where it is progressively cooled to a low temperature and loses the bulk of its remaining moisture. Cooling in the regenerative heat exchanger sets is accomplished by counter current flow of cold effluent gas from the in line charcoal adsorption units 30a, 30b or 30c. The bulk of the moisture is removed from the process gas in the first operating heat exchanger, the freezeout heat exchanger 26a or 26b, contacted in each set.

Each of the two regenerative heat exchanger sets are composed of two regenerative heat exchangers 26a, 27a and 26b, 27b, piped in series with a diaphragm operated control valve installed in an interconnecting pipeline between the shell sides. Cooling in the units is accomplished by cold gas flow through an inner spined tube while the process gas flow is conveyed through the shell sides over the spines of the inner tube. The first heat exchanger contacted in a set by the process gas is designated as a "freezeout" heat exchanger 26a or 26b since most of the remaining process gas moisture is to be condensed in these units.

When a regenerative heat exchanger set 27a or 27b is not in operation on the process gas, the "freezeout" heat exchanger 26a or 26b in the set is being defrosted or "derimed."

Gas leaving the regenerative heat exchangers can bypass the following step of the process through connection to the normally used purified gas effluent line of the regenerative heat exchangers. Bypass operation may be desired when only oxygen removal is required of the process. The inner tube of the heat exchangers cools the gaseous product from 35° F. to —220° F., removing all the moisture from the process stream. The overall units are designed for 186 p.s.i.g., and —320° to +200° F. minimum and maximum temperatures.

The gas leaving the heat exchanger 27a or 27b should be at —180° F. or lower to prevent moisture migration to the adsorption units 30a, 30b or 30c. These units, the condenser and heat exchangers, constitute what is referred to as a cold trap. This cold trap serves a dual purpose: removes moisture from the gas stream as set forth above, and cools the gases before they enter into any one of the adsorbers 30a, 30b or 30c, the next unit.

All low temperature components are contained in a box enclosure which contains powder insulation to minimize a heat leak into the low temperature portions of the process. The cold box 44 is designed for atmospheric pressure operation and is completely sealed so that moisture will not migrate inward. A silica gel cartridge 48 penetrates the cold box shell and provides for dry cold box air exchange during changes in atmospheric pressure and temperature conditions.

It is within the scope of this invention to remove oxygen as set forth above by operating the apparatus under partial operation conditions. Under these conditions, the adsorption units are bypassed and thereby oxygen can be removed.

It is necessary for the gases to be cooled considerably before entering the adsorbers 30a, 30b or 30c to insure sufficient adsorption of the radioactive gases and keep the size of the beds reasonable. A liquid nitrogen or liquid nitrogen-helium cycle system entering the respective adsorption unit through lines 37a, 37b and 37c and leaving through lines 38a, 38b and 38c can be used to attain the very low temperatures that are necessary for the operation of the adsorption units 30a, 30b and 30c. The nitrogen reservoir 42 of this refrigeration system can be used to remove heat in the cold trap condenser 24. This cooling system is maintained at higher than atmospheric pressure to prevent in-leakage of air and prevent any explosive hazard. The adsorption units 30a, 30b and 30c should be maintained at —280° F. during operation.

The gaseous fission products xenon and krypton will be removed from the hydrogen carrier gas in the adsorbers. There can be several adsorbers connected in parallel and valved for individual operation. The adsorbers 30a, 30b and 30c may contain an activated charcoal and are designed for continuous operation for approximately fifty days, after which time they can be disposed of as radioactive waste or else regenerated as herein described.

The purified hydrogen carrier gas after leaving the adsorbers 30a, 30b or 30c is at a low enough temperature to be used as the cooling medium in the counterflow regenerative heat exchangers of the cold trap. After compression in a compressor 34 the purified carrier gas is reintroduced into the stripping column 14 to complete the cycle.

As the gas flow rate affects the adsorption bed lifetime, the circulating process gas flow should be maintained at a rate equivalent to 0.72 c.f.m. of hydrogen at 45 p.s.i.a. at 120° F.

The equipment to be used in the above system is designed for continuous use during 150 days of operation of a nuclear plant with exposed fuel and resultant release of fission product gases from the fuel to a water system. The system has been used to remove all krypton and xenon, which will probably be released from 726 kilograms of fuel during 100 days of operation in the amounts set forth in Table I and any oxygen present in the liquid flow degassed.

Table I

| Isotope | Half-Life | Maximum Activity, Curies |
|---|---|---|
| Kr 85 m | 4.4 h | 9.96 |
| Kr 85 | 9.4 y | 104 |
| Kr 87 | 78 m | 1.86 |
| Kr 88 | 2.8 h | 11.4 |
| Xe 131 m.$^2$ | 12 d | 56.2 |
| Xe 133 m | 2.3 d | 38.5 |
| Xe 133 | 5.27 d | 3,325 |
| Xe 135 m | 15.6 m | 31.8 |
| Xe 135 | 9.13 h | 166 |
| Xe 137 | 3.9 m | .05 |
| Xe 138 | 17 m | .47 |

Although the invention has been described in its preferred form with a certain degree of particularity, it is understood that the present disclosure of the preferred form has been made only by way of example and that numerous changes in the details of construction and combination and arrangements of parts may be resorted to without departing from the spirit and the invention as hereinafter claimed.

We claim:
1. The method of collecting and retaining radioactive xenon and krypton in a compact means from a contaminated water stream which also contains oxygen gas comprising the steps of stripping said gases from said water stream with hydrogen carrier gas; heating said gases in a deoxo bed to about 200° F. to combine said oxygen stripped from said water stream with said carrier gas to form water and remove oxygen from said carrier gas; condensing said water by cooling from 120° F. to 35° F. to remove the thus formed water; cooling said carrier gas to a temperature of from 35° F. to −220° F.; passing said carrier gas over a charcoal adsorbent bed maintained at a temperature of about −280° F. to remove said xenon and krypton gases, and recirculating said carrier gas to said stripping column to strip said gases from said contaminated water stream.

2. The method of disposing of xenon and krypton fission product gases contained in a water system containing oxygen comprising the steps of flowing hydrogen carrier gas in counter-current flow with said contaminated water system in a stripping column to remove said xenon and krypton from said water system; heating said carrier gas containing xenon and krypton to about 200° F.; removing oxygen from said gases in a deoxo bed by combining said oxygen with said hydrogen carrier gas to form water vapor, condensing said water vapor and by low temperature means to remove the thus formed liquid water from the system; and removing said xenon and krypton by passing said gases over a charcoal bed maintained at a temperature of −280° F.

References Cited in the file of this patent

UNITED STATES PATENTS 1,670,014     Blaringhem     May 15, 1928

OTHER REFERENCES

Hurst et al.: "The Homogeneous Aqueous Reactor," Nuclear Power, May 1957, pages 193–195.

Steinberg et al.: "Recovery of Fission Product Noble Gases," Industrial and Engineering Chemistry, vol. 51, No. 1, January 1959, pages 47–50.